United States Patent
Backfolk et al.

(10) Patent No.: US 10,927,503 B2
(45) Date of Patent: Feb. 23, 2021

(54) METHOD TO FORM A WEB COMPRISING FIBERS

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/345,348

(22) PCT Filed: Oct. 27, 2017

(86) PCT No.: PCT/IB2017/056681
§ 371 (c)(1),
(2) Date: Apr. 26, 2019

(87) PCT Pub. No.: WO2018/078572
PCT Pub. Date: May 3, 2018

(65) Prior Publication Data
US 2019/0264394 A1  Aug. 29, 2019

(30) Foreign Application Priority Data

Oct. 28, 2016 (SE) .................................. 1651412-7

(51) Int. Cl.
| | | |
|---|---|---|
| D21H 11/18 | (2006.01) | |
| D21H 21/06 | (2006.01) | |
| D21H 23/04 | (2006.01) | |
| D21H 17/03 | (2006.01) | |
| D21H 17/70 | (2006.01) | |
| D21H 23/02 | (2006.01) | |
| D21H 17/20 | (2006.01) | |

(52) U.S. Cl.
CPC ............. *D21H 11/18* (2013.01); *D21H 17/03* (2013.01); *D21H 17/20* (2013.01); *D21H 17/70* (2013.01); *D21H 21/06* (2013.01); *D21H 23/02* (2013.01); *D21H 23/04* (2013.01)

(58) Field of Classification Search
CPC ........ D21H 11/18; D21H 21/24; D21H 21/56; D21H 17/70; D21H 23/02; D21H 17/03; D21H 17/20; D21H 21/06; D21H 23/04; D21H 19/10; D21H 19/34; D21H 23/22; D21H 23/26; D21F 11/002; D21F 11/00
See application file for complete search history.

(56) References Cited

U.S. PATENT DOCUMENTS

| | | |
|---|---|---|
| 4,952,278 A | 8/1990 | Gregory et al. |
| 9,303,360 B2 * | 4/2016 | Castro .................... D21H 17/25 |
| 9,453,305 B2 * | 9/2016 | Imppola ................. D21H 11/18 |
| 9,518,364 B2 * | 12/2016 | Heiskanen ............. D21H 11/18 |
| 9,663,901 B2 * | 5/2017 | Heiskanen ............. D21H 11/18 |
| 10,132,040 B2 * | 11/2018 | Castro ................... D21H 17/375 |
| 10,501,890 B2 * | 12/2019 | Heiskanen ............. D21H 11/18 |
| 2014/0345816 A1 * | 11/2014 | Heiskanen ............. D21H 17/17 162/158 |
| 2015/0041089 A1 * | 2/2015 | Castro .................... D21H 19/52 162/157.6 |
| 2015/0041091 A1 * | 2/2015 | Castro .................. D21H 17/375 162/168.3 |
| 2015/0114581 A1 * | 4/2015 | Kinnunen ................. B32B 7/02 162/125 |
| 2015/0315747 A1 * | 11/2015 | Heiskanen .............. A47L 13/16 162/181.2 |
| 2018/0245286 A1 * | 8/2018 | Heiskanen ............. D21H 27/30 |
| 2019/0264394 A1 * | 8/2019 | Backfolk ............... D21H 23/04 |
| 2020/0023627 A1 * | 1/2020 | Heiskanen ............. D21H 23/02 |
| 2020/0171796 A1 * | 6/2020 | Backfolk et al. ..... B32B 15/085 |
| 2020/0173109 A1 * | 6/2020 | Saukkonen et al. ... D21H 11/18 |

FOREIGN PATENT DOCUMENTS

| | | | | |
|---|---|---|---|---|
| EP | 2841651 B1 * | 11/2017 | ............. | D21H 21/56 |
| JP | 6310446 B2 * | 4/2018 | ............. | D21H 21/16 |
| WO | 2013038061 | 3/2013 | | |
| WO | WO-2013160564 A1 * | 10/2013 | ............. | D21H 21/16 |
| WO | 2014072914 | 5/2014 | | |
| WO | 2014091413 | 6/2014 | | |
| WO | 2014154937 | 10/2014 | | |
| WO | WO-2018078572 A1 * | 5/2018 | ............. | D21H 17/20 |

OTHER PUBLICATIONS

International Searching Authority, Written Opinion of the International Searching Authority, PCT/IB2017/056681, dated May 3, 2018.
International Searching Authority, International Search Report, PCT/IB2017/056681, dated May 3, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.

* cited by examiner

*Primary Examiner* — Jose A Fortuna
(74) *Attorney, Agent, or Firm* — Greer, Burns & Crain, Ltd.

(57) ABSTRACT

The invention discloses a method to enable the efficient use of surfactants in web forming of a cellulose containing material, e.g. in the making of paper or paperboard. The method comprises the addition of microfibrillated cellulose (MFC) or nanocrystalline cellulose (NCC) to the white water in a web-forming process in order to form complexes with surface active agents. The formed complexes are at least partly recycled to the process. This enables the producer to have control over the concentration of surface active agents in the system.

16 Claims, 1 Drawing Sheet

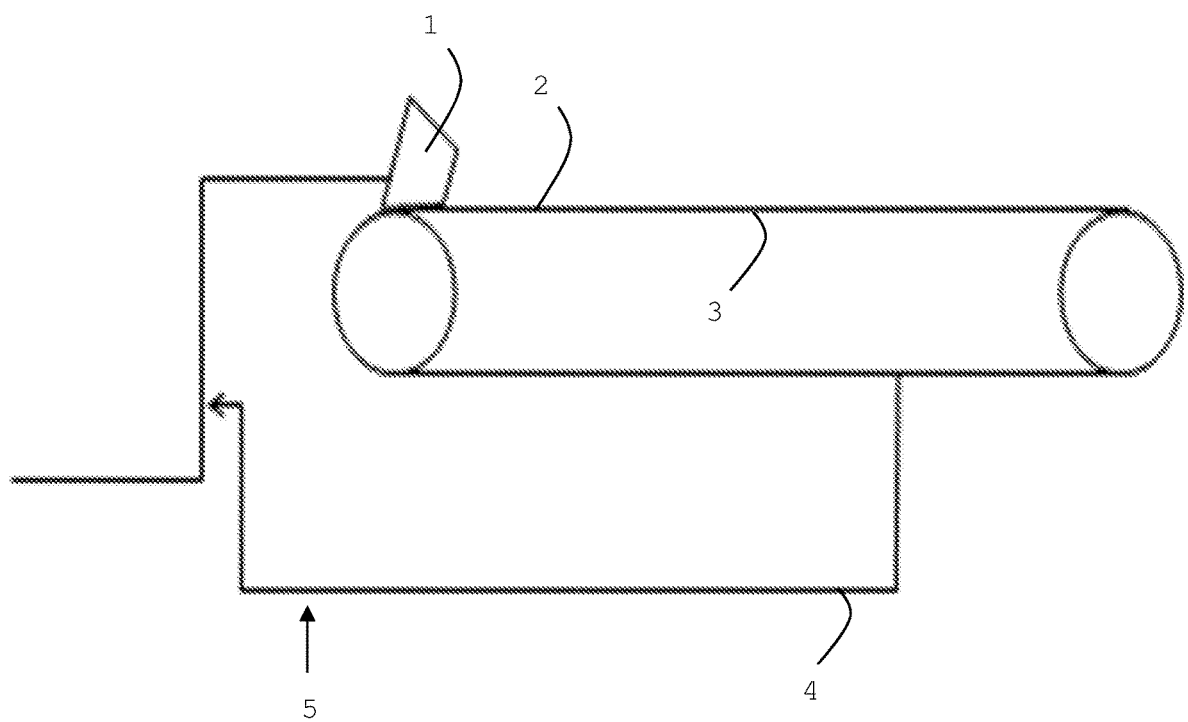

METHOD TO FORM A WEB COMPRISING FIBERS

This application is a U.S. National Phase under 35 U.S.C. § 371 of International Application No. PCT/IB2017/056681, filed Oct. 27, 2017, which claims priority under 35 U.S.C. §§ 119 and 365 to Swedish Application No. 1651412-7, filed Oct. 28, 2016.

TECHNICAL FIELD

The present invention relates to a method to form a web comprising cellulose fibers. The invention further relates to a paper or paperboard product produced by said method.

BACKGROUND

The white water in a modern paper or board machine is recycled and reused to a great extent through the short and long circulations. In the short circulation, excess white water from the stock or furnish in the web forming is collected and recycled to dilute the thick stock pulp to be delivered to the headbox. The white water in the short circulation can, e.g., be recycled to the wire pit, or to a position between the wire pit and the headbox.

In the long circulation, excess white water from the short circulation and other parts of the papermaking machine is recycled to the stock preparation, e.g. to the blend chest. The white water contains fibers, fines and chemicals, which are filtered and reused, usually within the long circulation loop. Part of the reject is disposed and used e.g. as landfill. Part of the white water is further sent to waste water treatment plant.

In recent years, the use of surface active chemicals or surfactants in paper- or paperboard making has increased. The main reason of using surfactants has mainly been to affect interfaces between e.g. pigments and water and hence to improve wetting and dispersability or re-dispersability. Another purpose has been to use surfactants as de-bonding agents or to adjust fiber-fiber interaction. New web-forming technologies, e.g. foam-forming, has further increased the use of surfactants.

However, although surfactants are usually beneficial at low levels, there are several problems associated with the presence of surfactants in paper- or paperboard making, such as undesired migration of the surfactants into food or applied barrier layer, reduced barrier properties, unwanted foaming at undesired places, negative effects at water treatment plants, toxicity, interference with other chemicals causing unstable wet end chemistry etc. An accumulated circulation of surfactants in the process may thus cause undesired effects, runnability issues, variations in end product quality and reduced production efficiency.

Other areas where the potential use of surfactants are increasing are for example light weight composites or aerogels. These kind of composites could be made, for example, from nanocellulose and surface active chemicals which thus forms a bulky structure. An excess of surfactants are often formed when drying the structure, which thus leads to the problems described above.

There thus remains a need for a process to manufacture a continuous web, such as paper or paperboard, aerogels or light weight composites, comprising fibers or cellulose material, which process enables the use of surfactants as a functional chemical without causing the undesired effects.

SUMMARY

It is an object of the present disclosure to enable the efficient use of surfactants in web forming of a cellulose containing material, e.g. in the making of paper or paperboard, without the negative effects associated with the prior art.

This, and further advantages, is wholly or partially achieved by the method, the paper or paperboard product and the use according to the appended independent claims. Embodiments are set forth in the appended dependent claims, and in the following description.

According to a first aspect of the invention, there is provided a method to form a continuous web comprising fibers and/or fibrils, which method comprises the steps of:
  providing a furnish comprising fibers and/or fibrils and a surface active agent,
  applying said furnish onto a wire to form a web,
  draining white water from said web,
  adding microfibrillated cellulose (MFC) or nanocrystalline cellulose (NCC) to said white water, whereby said surface active agent is bonded to or physically interacting with said MFC or NCC forming a complex,
  recycling said complex to the furnish and/or to the web The fibers may be cellulose fibers (and/or cellulose material) or other natural fibers, synthetic fibers or special fibers such as glass fibers. The fibrils may be cellulose nanofibrils such as microfibrillated cellulose.

The addition of MFC or NCC to the white water enables the producer to have control over the concentration of surface active agents in the system. In this way, problems related to an excess of surface active agents in the system is diminished or strongly reduced, giving rise to a stable manufacturing process and more cost efficient process since chemical retention is more efficient. The excess surface active agents accumulate in the white water, either in dissolved form or e.g. as micelles, where it is bonded to the surface of the added MFC or NCC, forming a reversible or irreversible complex. The bonding or interaction between MFC or NCC and the surface active agent may, for example, be electrostatics (attractive), hydrophobic, induction, or dispersion or a combination of these interactions. In addition, the interaction maybe triggered by controlling, for example, the pH, ionic conductivity, use of mono, di- or multivalent electrolytes, temperature, shear stability or solubility of any of the components.

The surface active agent—MFC or surface active agent —NCC complex may be separated from at least a part of said white water before being recirculated to the furnish. The separation of the complex may be accomplished by use of any known separation technique, e.g. by use of a hydro cyclone, a screen, a filter or by flotation. The separated complex may then be recycled or reused (i.e. added) to the furnish or to the formed web in a controlled amount. The complex may be added to the furnish prior to the furnish is applied on the wire. Alternatively, the complex may be added to the web after the web is formed on the wire e.g. added in the coating or surface sizing thereof or sprayed on the wet web before press section. Another option is to add the collected complex to the broke or to chemicals or fillers to be used in the process. Part of the complex can further be separated and used e.g. as an additive in composites, etc.

The MFC- or NCC-surface active agent complex added to the furnish or to the web may contribute to improved properties of the formed product, such as increased bulk, improved printability, softness and/or optical properties. The separation "from at least a part of the white water" also includes a concentration of the complex to a first part of the white water and the separation of a second part, with lower concentration of the complex (e.g. by flotation), from said first part having higher concentration. Said first part having higher concentration of the complex may then be recycled to the furnish.

The white water, separated from the complex, may also at least partly be recycled to the furnish, preferably prior to the furnish being added to the wire.

Part of the white water may also be treated as effluent water or as a sludge material.

The surface active agent may be present in the furnish at a concentration of e.g. 0.01-1% (w/w) based on the total solid content of said furnish.

The MFC or NCC added to the white water may be modified or unmodified and preferably has a specific surface area of 1 to about 300 $m^2/g$. In one preferred embodiment, the MFC or NCC has a specific surface area of at least 5 $m^2/g$, preferably at least 10 $m^2/g$, most preferably at least 15 $m^2/g$, e.g. between 15-200 $m^2/g$, the surface area being determined for a freeze-dried material by adsorption of Nitrogen gas according to the BET method using e.g. Micromeritics Tri Star surface area analyzer. MFC is frozen in 4 wt % solids with e.g. liquid nitrogen, and then freeze-dried by use of a freeze-drying instrument, (e.g. CHRIST ALPHA 2-4). The nitrogen gas is adsorbed to the dried samples in the temperature of the liquid nitrogen (T=−196° C.). Microfibrillated cellulose having such high specific surface area improves the bonding of the surface active agent.

In one embodiment, a coagulant, a hydrophobic and/or a functional chemical is added to the white water in addition to the MFC or NCC. The coagulant or the hydrophobic or functional chemical can be added to the white water prior to, simultaneously or after the addition of MFC or NCC, but before the separation of the complex from the white water. The MFC or NCC and the coagulant or the chemical can be pre-mixed. Alternatively, the functional additive can be added during the manufacturing process of MFC or NFC such as prior to a fluidization step or between fluidization steps. The addition of a coagulant improves the formation of complexes that are more easily separated from the white water in the separation step. The coagulant may e.g. be selected from the group consisting of alum, aluminium sulphate, polyaluminium chloride (PAC), polydiallyldimethylammonium chlorid (poly-DADMAC), Polyethylene Imine, polyamideamines, polyvinyl pyrrolidine, and polyamines. Also other short cationic polymer such as highly charged dextrins or starches or other polyelectrolytes or mixtures of e.g. mono, di or multivalent electrolytes and polyelectrolytes that are capable of enhancing the interaction between the MFC or the NCC and the surface active chemicals.

The hydrophobic chemical that may be added in addition to the MFC or the NCC to the white water may be, e.g., AKD, ASA, rosin or Polyethylene or paraffin wax, styrene maleic anhydrides, polyurethanes or any other functional chemical. These additives provide more efficient interaction with hydrophobic moieties on the surfactants. The said hydrophobic chemical can also be added during the MFC fluidization step as disclosed above.

In another embodiment, the MFC or the NCC may be mixed with an anti-foaming agent. The antifoaming agent can be e.g. a surfactant or silicone or mineral oils.

The surface active agent present in the furnish can be selected from the group anionic surfactants, cationic surfactants, non-ionic surfactants, zwitterionic surfactants, or combinations thereof. The surface active agent may include edible surface active chemicals and/or de-foaming agents. The surface active chemicals might also be e.g. amphiphilic polymers such as block copolymers. Example of cationic surfactants are laurylamine hydrochloride, trimethyl dodecylammonium chloride, cetyl trimethylammonium bromide and dodecyl trimethyl ammonium chloride. Example of anionic surfactants are e.g. alkylbenzene sulfonates, fatty acid, soaps, lauryl sulfate, di-alkyl sulfosuccinate, lignosulfonates, etc such as Na dodecyl benzene sulfonate, or Na dodecyl sulfate, or NA stearate. Example of nonionic surfactants are polyoxyethylene alcohol, alkyl ethoxylate, polysorbate, propyleneoxide modified chemicals. Amphoteric surfactants can be e.g. lipids or betaines.

Cationic or amphoteric surface active agents are preferably collected by unmodified or carboxylated MFC or NCC. The MFC or NCC might also be grafted with amphoteric or anionic polyelectrolytes that provides additional anionic groups to the MFC or NCC, respectively.

Anionic surface active agents are preferably collected by cationic MFC or NCC, while nonionic surface active agents are preferably collected by native or hydrophobic MFC or NCC. Cationic MFC or NCC can be obtained by surface grafting using a cationic polymer such as starch or PDAD-MAC, PVAm or PEI, or through chemical modification of the MFC or NCC respectively. A hydrophobic MFC or NCC can be obtained either by modifying with a resin such as AKD or ASA or resin, or through chemical modification such as silylation.

In one embodiment of the invention, the MFC- or NCC-surface active agent complex is recycled to the web by the addition of the complex to a coating- or surface sizing composition applied onto the web, which composition further comprises a metal salt. The metal salt may be a monovalent salt, but is preferably a metal salt of a multivalent metal. Said salt may e.g. be calcium chloride, aluminum chloride, magnesium chloride, magnesium bromide, calcium bromide, barium chloride, calcium nitrate, magnesium nitrate, barium nitrate, calcium acetate, magnesium acetate or barium acetate or a mixture of these. The addition of a metal salt improves the retention of the complex and further improves the printability of the formed product.

In one embodiment of the invention, the furnish is provided in the form of a foamed furnish comprising cellulose fibers and a surface active agent. Such a foamed furnish may be accomplished e.g. by providing a foam comprising water and a surface active agent and incorporating cellulose fibers in the foam.

The surface active agent present in the furnish may have been actively added to the furnish or a surface active agent arising from the pulp or added together with chemicals in the pulp preparation.

The continuous web formed by the method of the invention comprises fibers and/or cellulose material, such as cellulose fibers or other natural or synthetic fibers and/or fibrils such as micro fibrillated cellulose or nanofiber cellulose. The web preferably comprises fibers or cellulose material in an amount of at least 50 wt %, more preferably at least 70 wt %, based on the total dry content of said web.

In one preferred embodiment of the invention, the web formed by the method is a paper or a paperboard ply. The forming of a paper or a paperboard ply in accordance with the invention diminishes problems previously caused by an excess of surfactant in the process, such as foaming at undesired places, reducing barrier properties, undesired effects at water treatment plants etc. The ply of paperboard formed may be used as a layer in a multylayer paperboard structure, e.g. as a top, a middle and/or a refeverse ply. The invention further relates to a paper or a paperboard including the web produced by the method. The paper formed has preferably a grammage in between 70-200 gsm, while the paperboard preferably has a grammage in between 200-350 gsm.

In another embodiment of the invention, the web formed by the method is an MFC film. In this embodiment, the furnish comprises microfibrillated cellulose to an amount of at least 50 weight %, or at least 70 weight %, or at least 85 weight %, calculated on the total solid content of the furnish.

According to a second aspect, the invention relates to the use of MFC or NCC to adsorb and separate surface active agents from a furnish, such as a paper- or paperboard making furnish comprising fibers and/or fibrils.

In another embodiment of the invention, the web formed by the method is a nonwoven fabric. In this embodiment, at least a part of the fibers are natural fibers, synthetic fibers or special fibers such as glass fibers.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., Cellulose fibres, nanofibrils and microfibrils: The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose (NFC), fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, collider, friction grinder, ultrasound sonicator, fluidizer such as microfluidizer, macrofluidizer or fluidizer-type homogenizer. Depending on the MFC manufacturing method, the product might also contain fines, or nanocrystalline cellulose (NCC) or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50

Nanocrystalline cellulose (NCC) is produced by acid hydrolysis of cellulose from many sources and is also referred to as cellulose nanocrystals, cellulose crystallites, cellulose whiskers and rod-like cellulose microcrystals that may be derived from wood, cotton, hemp, flax, wheat straw, mulberry bark, ramie, tunicin and cellulose from algae and bacteria. NCC produced from plant celluloses have typically a diameter of 5-70 nm and a length of 100-250 nm, while NCC from tunicates, algae and bacteria have a diameter 5-70 nm and a length of 100 nm-several μm.

The specific surface area is measured in accordance with the BET method using a Micromeritics Tri Star surface area analyze. According to this method, MFC is frozen in 4 wt % solids with e.g. liquid nitrogen, and then freeze-dried by use of a freeze-drying instrument (e.g. CHRIST ALPHA 2-4). The nitrogen gas is adsorbed to the dried samples at the temperature of the liquid nitrogen (t=−196° C.).

According to the invention, MFC or NCC is added as a surfactant adsorbent to the white water in a web-forming process, which process uses wet-laid technology, preferably in a paper- or paperboard machine. Another option is to add MFC to broke, which broke comprises surface active agents. The web formed can e.g. be a web for paper or paperboard making, a wet wipe, tissue, an absorbent or an MFC film.

Embodiments of the invention will now be described, by way of examples, with reference to the accompanying schematic drawing.

FIG. 1 shows schematically the forming section of a paper or paperboard machine.

With reference to FIG. 1, and in accordance with one embodiment of the invention, a furnish comprising cellulose fibers and a surface active agent is applied on a forming wire (2) from a headbox (1).

In the embodiment of manufacturing of paper or paperboard, the furnish may comprise further additives well known in the art for paper- or board making, e.g. fillers, such as clay, talc, silica, and or calcium carbonate, chemicals such as dyes, optical brightening agents, wet strength chemicals, strength chemicals, fixatives, biocides, sizing agents, drainage and retention agents etc. The furnish is a mixture of water, fibers, surface active agents and other additives and usually have a consistency of e.g. 0.5-2% in the headbox. The furnish may comprise chemical or mechanical pulp from hardwood and/or softwood fibers. It can also contained recycled pulp, deinked pulp, coated or uncoated broke or mixture of various pulps. The pulp might also contain synthetic fibers.

After the furnish is applied onto the wire forming a sheet, white water is drained from the sheet through the wire (2) and, at least partly, recirculated to the furnish preparation in a circulation loop (4). In accordance with the invention, MFC or NCC is added to the white water (5), after it has been drained from the sheet, but before it is recirculated to the stock preparation. At this stage, the white water, in addition to surface treatment agents, may comprise fibers, fines and chemicals, and usually has a consistency of less than 0.5%, e.g. between 0.01-0.5% or 0.01-0.3%. At such low consistencies, the MFC or NCC added can efficiently form complexes with the surface treatment agents present in the white water.

Before being recirculated to the furnish preparation, the white water passes one or several separation steps, e.g. screening, cleaning and/or flotation steps, where valuable fibers and chemicals are collected. In at least one such separation step, the formed MFC-surface active agent complex (or the formed NCC-surface active agent complex) may be separated from part of the white water. Such complex is thereafter added to the furnish in the stock preparation in a controlled amount. Alternatively, the MFC- or NCC-surface active agent complex may be recirculated directly to the stock preparation together with the white water.

The method may comprise further steps known in the art to make the final paper or paperboard, such as drying, pressing, surface-sizing, coating and/or calendering.

In one preferred embodiment of the invention, the method of forming the web includes foam forming, in which the web is formed from a foamed furnish suspension. This may be accomplished by turning the furnish into a foamed suspension as it is fed from the headbox to the forming wire. Foam forming gives rise to a higher bulk, which is of particular use in the making of tissue paper or paperboard. In this embodiment, a furnish comprising cellulose fibers and a surface active agent is foamed before being applied onto the wire. The foaming of the furnish may be accomplished by exposing the aqueous furnish to a vigorous shearing action, whereby air is dispersed in the furnish in the form of very small bubbles. After the foamed furnish suspension has been applied onto the wire to form a fibrous web, white water is drained from the web, to which MFC or NCC is added before it is recirculated to the stock preparation. As previously described, the thereby formed complexes of MFC- or NCC- surface active agent may be separated and recycled to the furnish in the stock preparation in a controlled amount.

The method of the invention may also be used to manufacture an MFC film. In this embodiment, an MFC suspension is applied onto a wire, preferably at a consistency of 0.1-1 wt %. The suspension comprises MFC fibers, usually above 70 weight % or above 80 weight %, based on the weight of solids of the suspension, and a surface active agent. Subsequent to the web being placed onto the wire, it is dewatered to form a film. The drained white water is recircled to the preparation of the MFC suspension. A second, additional MFC is added to the drained white water before it is recircled to the preparation of the MFC suspension. Said second MFC preferably has a higher surface area than said first MFC. The film formed by the method of the invention preferably has a has an oxygen transmission rate (OTR) of less than 500 ml/m$^2$/day, or less than 100 ml/m$^2$/day, or less than 50 ml/m$^2$/day, or less than 10 ml/m$^2$/day or less than 1 ml/m$^2$/day. The film has a basis weight of less than 50 g/m$^2$, or preferably less than 35 g/m$^2$, less than 25 g/m$^2$, or less than 20 g/m$^2$.

The invention claimed is:

1. A method to form a continuous web comprising fibers and/or fibrils, which method comprises the steps of:
    providing a furnish comprising fibers and/or fibrils and a surface active agent,
    applying said furnish onto a wire to form a web,
    draining white water from said web,
    adding microfibrillated cellulose (MFC) and/or nanocrystalline cellulose (NCC) to said white water, whereby said surface active agent is bonded to or physically interacting with said MFC or NCC forming a complex,
    recycling said complex to the furnish and/or to the web.

2. A method according to claim 1, wherein said complex, comprising the MFC or the NCC and the surface active agent, is separated from at least a part of the white water before being recycled to the furnish.

3. A method according to claim 1, wherein the MFC or NCC has a specific surface area of at least 5 m$^2$/g.

4. A method according to claim 1, wherein a coagulant is added to the white water in addition to the MFC or NCC.

5. A method according to claim 4, wherein the coagulant is selected from the group consisting of alum, polyaluminium chloride (PAC), polydiallyldimethylammonium chloride (poly-DADMAC), polyamines and ferric sulphate.

6. A method according to claim 1, wherein the surface active agent is a cationic or an amphoteric surface active agent and the MFC or NCC is unmodified.

7. A method according to claim 1, wherein the surface active agent is an anionic surface active agents and the MFC or NCC is cationic.

8. A method according to claim 1, wherein the surface active agent is a nonionic surface active agent and the MFC or NCC is hydrophobic or native.

9. A method according to claim 1, wherein the complex is recycled to the web by the addition of the complex to a coating or surface sizing composition applied onto the web and wherein said coating or surface sizing composition further comprises a metal salt.

10. A method to form a web according to claim 1, wherein the furnish comprising the surface active agent is a foamed furnish.

11. A method to form a web according to claim 1, wherein the web is a paper or a paperboard ply.

12. A method to form a web according to claim 1, wherein the web is an MFC film.

13. A method to form a web according to claim 1, wherein the web is a nonwoven fabric.

14. A method according to claim 1, wherein the MFC or NCC has a specific surface area of at least 10 m$^2$/g.

15. A method according to claim 1, wherein the MFC or NCC has a specific surface area of at least 15 m$^2$/g.

16. A method according to claim 1, wherein the MFC or NCC has a specific surface area between 15-200 $m^2/g$ determined for a freeze-dried material by adsorption of nitrogen gas according to the BET method.

* * * * *